United States Patent
Park et al.

(10) Patent No.: US 9,052,333 B2
(45) Date of Patent: Jun. 9, 2015

(54) SENSOR CAPABLE OF MEASURING ACCELERATION, ANGULAR VELOCITY, AND DC ACCELERATION

(75) Inventors: Jung Tae Park, Gyunggi-do (KR); Seung Heon Han, Gyunggi-do (KR); Jong Woon Kim, Gyunggi-do (KR); Heung Woo Park, Gyunggi-do (KR); Jung Won Lee, Gyunggi-do (KR); Jung Eun Noh, Gyunggi-do (KR); Won Kyu Jeung, Gyunggi-do (KR); Sung Jun Lee, Gyunggi-do (KR)

(73) Assignee: SAMSUNG ELECTRO-MECHANICS CO. LTD., Gyunggi-Do (KR)

( * ) Notice: Subject to any disclaimer, the term of this patent is extended or adjusted under 35 U.S.C. 154(b) by 291 days.

(21) Appl. No.: 13/592,198

(22) Filed: Aug. 22, 2012

(65) Prior Publication Data
US 2013/0133426 A1    May 30, 2013

(30) Foreign Application Priority Data

Nov. 28, 2011    (KR) .................. 10-2011-0125239

(51) Int. Cl.
| | | |
|---|---|---|
| G01P 15/11 | (2006.01) | |
| G01P 15/08 | (2006.01) | |
| G01P 15/12 | (2006.01) | |
| G01C 19/56 | (2012.01) | |
| G01P 15/09 | (2006.01) | |
| G01P 15/097 | (2006.01) | |

(52) U.S. Cl.
CPC ............ *G01P 15/12* (2013.01); *G01C 19/56* (2013.01); *G01P 15/09* (2013.01); *G01P 15/097* (2013.01); *G01P 2015/084* (2013.01)

(58) Field of Classification Search
CPC ....... G01P 15/105; G01P 18/11; G01P 15/18; G01P 15/0802; G01P 15/0885; G01P 1/003; G01P 15/11; G01P 15/12
USPC ............... 73/514.16, 514.32, 514.14, 514.31, 73/514.33; 324/207.21, 207.26
See application file for complete search history.

(56) References Cited

U.S. PATENT DOCUMENTS

| | | | | |
|---|---|---|---|---|
| 4,967,598 A * | 11/1990 | Wakatsuki et al. | ........ | 73/514.12 |
| 5,027,657 A * | 7/1991 | Juckenack et al. | .......... | 73/514.13 |
| 6,131,457 A * | 10/2000 | Sato | ............................ | 73/514.31 |
| 6,507,187 B1 * | 1/2003 | Olivas et al. | .............. | 324/207.21 |
| 7,392,704 B2 * | 7/2008 | Shoji | .......................... | 73/514.31 |

FOREIGN PATENT DOCUMENTS

KR    1020110072229 A    6/2011

* cited by examiner

*Primary Examiner* — Helen Kwok
(74) *Attorney, Agent, or Firm* — Bracewell & Giuliani LLP; Brad Y. Chin

(57) ABSTRACT

Disclosed herein is an inertial sensor including: a membrane; a mass body provided under the membrane; a plurality of patterned magnets provided under the mass body; and a magnetoresistive element provided to be spaced apart from the mass body and measuring static DC acceleration acting on the mass body through resistance changed according to magnetic fields of the plurality of patterned magnets. The plurality of patterned magnets and the magnetoresistive element are included, thereby making it possible to measure static DC acceleration (particularly, gravity acceleration) that is difficult to measure using an existing to piezoelectric element.

14 Claims, 7 Drawing Sheets

SENSOR CAPABLE OF MEASURING ACCELERATION, ANGULAR VELOCITY, AND DC ACCELERATION

CROSS REFERENCE TO RELATED APPLICATION

This application claims the benefit of Korean Patent Application No. 10-2011-0125239, filed on Nov. 28, 2011, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used in various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like, The inertial sensor generally adopts a configuration in which a mass body is adhered to an elastic substrate such as a membrane, or the like, in order to measure acceleration and angular velocity. Through the configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be obtained by Coriolis force "F=2 mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be obtained by detecting the Coriolis force (F) applied to the mass body.

Meanwhile, an inertial sensor according to the prior art includes a piezoelectric element provided on an upper portion of a membrane in order to drive a mass body or sense displacement of the mass body as disclosed in Korean Patent Laid-Open Publication No. 10-2011-0072229. However, in the case of measuring acceleration by sensing displacement of the mass body using the piezoelectric element as in the prior art, due to characteristics of the piezoelectric element such as characteristics that generated charges disappear in the piezoelectric element or the piezoelectric element is sensitive to a temperature, it is difficult to measure static DC acceleration (particularly, gravity acceleration).

SUMMARY OF THE INVENTION

The present invention has been made in an effort to provide an inertial sensor capable of measuring static DC acceleration (particularly, gravity acceleration) by including a plurality of patterned magnets and a magnetoresistive element.

According to a preferred embodiment of the present invention, there is provided an inertial sensor including: a membrane; a mass body provided under the membrane; a plurality of patterned magnets provided under the mass body; and a magnetoresistive element provided to be spaced apart from the mass body and measuring static DC acceleration acting on the mass body through resistance changed according to magnetic fields of the plurality of patterned magnets.

The inertial sensor may further include a ferromagnetic material provided on a lower surface of the mass body, wherein the magnet is formed by locally magnetizing the ferromagnetic material.

The inertial sensor may further include: a ferromagnetic material provided on a lower surface of the mass body; and an electromagnet provided to be spaced apart from the mass body and additionally forming the magnet by locally magnetizing the ferromagnetic material The inertial sensor may further include a post provided under an edge of the membrane, wherein the mass body is provided under a central portion of the membrane.

The inertial sensor may further include a cap having an edge coupled to a lower surface of the post so as to cover the mass body and the post and spaced apart from the mass body.

The magnetoresistive element may be provided on the cap.

An upper surface of the cap may be provided with a concave part depressed in a thickness direction.

Each of the plurality of patterned magnets may have different magnetic forces.

The plurality of patterned magnets may include: a first magnet provided on the center axis of the mass body; and a plurality of second magnets provided on a single circle or concentric circles based on the first magnet.

The plurality of second magnets may be provided in a first direction and a second direction perpendicular to the first direction based on the first magnet.

The plurality of second magnets may be provided to be symmetrical to each other based on the first magnet.

The inertial sensor may further include a piezoelectric element provided on the membrane.

The piezoelectric element may be formed of lead zirconate titanate (PZT), barium titanate ($BaTiO_3$), lead titanate ($PbTiO_3$), lithium niobate ($LiNbO_3$), or quartz ($SiO_2$).

The magnet may be formed to be protruded from a lower surface of the mass body.

DESCRIPTION OF THE PREFERRED EMBODIMENTS

Figure 1A:
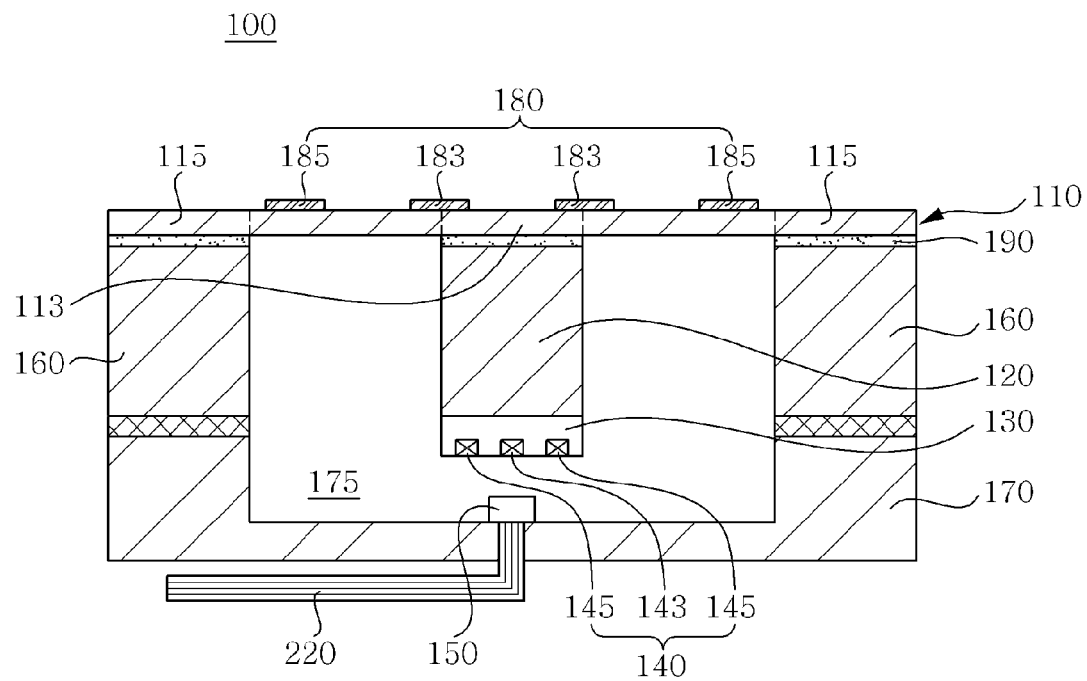
FIGS. 1A and 1B are cross-sectional views of an inertial sensor according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 1B:
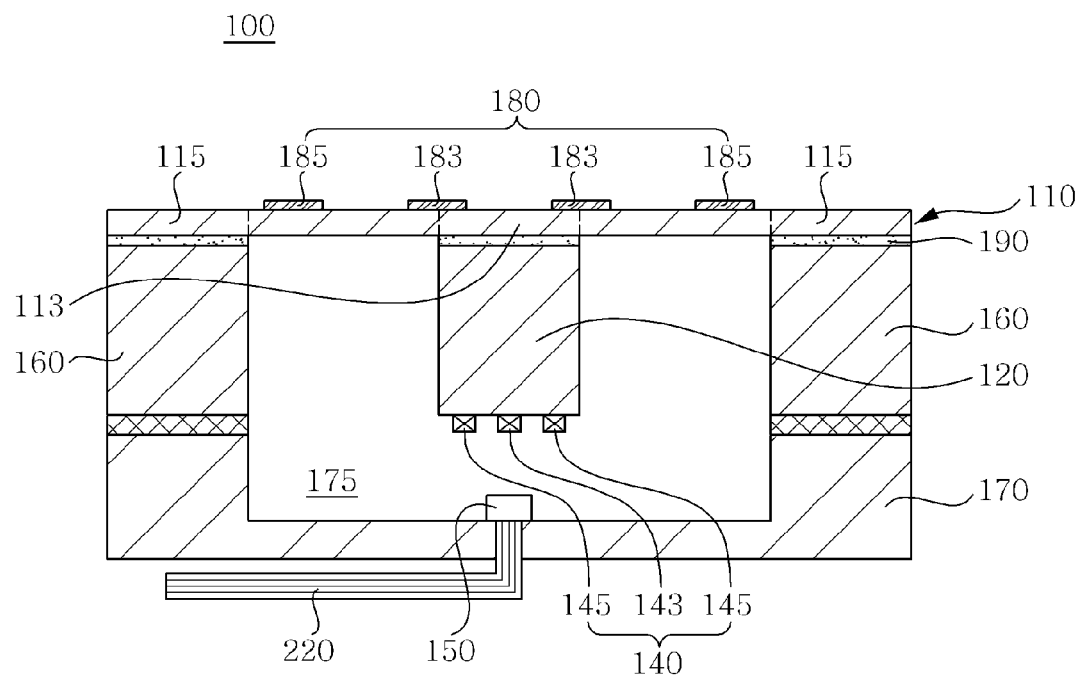
Figure 2:
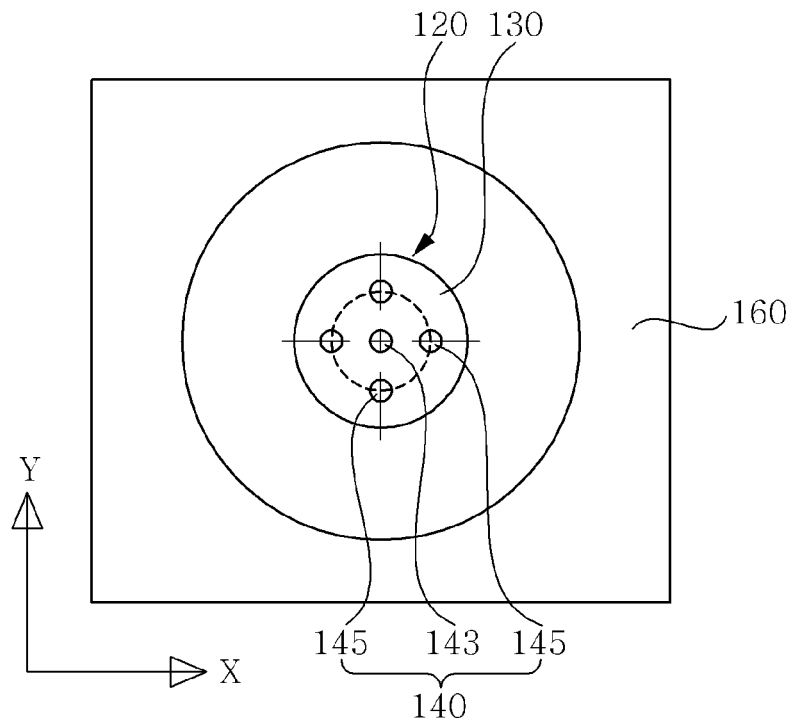
FIG. 2 is a bottom view in which a cap is removed in the inertial sensor shown in FIG. 1A.

FIGS. 1A and 1B are cross-sectional views of an inertial sensor according to a preferred embodiment of the present invention; FIG. 2 is a bottom view in which a cap is removed in the inertial sensor shown in FIG. 1A.

As shown in FIGS. 1A to 2, the inertial sensor 100 according to the present embodiment is configured to include a membrane 110, a mass body 120 provided under the membrane 110, a plurality of patterned magnets 140 provided under the mass body 120, and a magnetoresistive element 150 provided to be spaced apart from the mass body 120 and measuring static DC acceleration acting on the mass body 120 through resistance changed according to magnetic fields of the plurality of patterned magnets 140.

The membrane 110 is formed in a plate shape and has elasticity so that the mass body 120 may be displaced. Here, a boundary of the membrane 110 is not accurately partitioned but may be partitioned into a central portion 113 of the membrane 110 and an edge 115 provided along the outside of the membrane 110 as shown. In this case, a lower portion of the central portion 113 of the membrane 110 is provided with the mass body 120, and a lower portion of the edge 115 of the membrane 110 is provided with a post 160. Therefore, the edge 115 of the membrane 110 is fixed by being supported by the post 160, and displacement corresponding to movement of the mass body 120 is generated at the central portion 113 of the membrane 110 based on the fixed edge 115 of the membrane 110.

More specifically describing the mass body 120 and the post 160, the mass body 120 is provided under the central portion 113 of the membrane 110 to thereby be displaced by inertial force or Coriolis force. In addition, the post 160 is formed in a hollow shape and supports the lower portion of the edge 115 of the membrane 110 to thereby serve to secure a space in which the mass body 120 may be displaced. Here, the mass body 120 may be formed in, for example, a cylindrical shape and the post 160 may be formed in a square pillar shape in which a cavity having a cylindrical shape is formed in at a center thereof. That is, when being viewed from a transverse section, the mass body 120 is formed in a circular shape and the post 160 is formed in a square shape having a circular opening provided at the center thereof (See FIG. 2). However, the shape of the mass body 120 and the post 160 is not limited thereto, but may be all shapes known in the art. Meanwhile, the above-mentioned membrane 110, the mass body 120, and the post 160 may be formed by selectively etching a silicon substrate such as a silicon on insulator (SOI) substrate, or the like.

In addition, since the mass body 120 needs to be bonded to the central portion 113 of the membrane 110 and the post 160 needs to be bonded to the edge 115 of the membrane 110, a bonding layer 190 may be provided between the mass body 120 and the central portion 113 of the membrane 110 and between the post 160 and the edge 115 of the membrane 110.

Additionally, the lower portion of the post 160 may be provided with a cap 170 serving to protect the mass body 120. Here, the cap 170 has an edge coupled to a lower surface of the post 160 so as to cover the mass body 120 and the post 160. In this configuration, the cap 170 is spaced apart from the mass body 120 so as to secure a space in which the mass body 120 may be displaced. In addition, a concave part 175 depressed in a thickness direction is formed on an upper surface of the cap 170 to reduce damping force of air acting on the mass body 120, thereby making it possible to improve dynamic characteristics.

Meanwhile, the membrane 110 may be provided with a piezoelectric element 180 to drive the mass body 120 or sense the displacement of the mass body 120. Here, the piezoelectric element 180 may be formed of lead zirconate titanate (PZT), barium titanate ($BaTiO_3$), lead titanate ($PbTiO_3$), lithium niobate ($LiNbO_3$), quartz ($SiO_2$), or the like. More specifically, when voltage is applied to the piezoelectric element 180, an inverse piezoelectric effect that the piezoelectric element 180 is expanded and contracted is generated. This inverse piezoelectric effect is used, thereby making it possible to drive the mass body 120 provided under the membrane 110. On the other hand, when stress is applied to the piezoelectric element 180, a piezoelectric effect that a potential difference appears is generated. This piezoelectric effect is used, thereby making it possible to sense the displacement of the mass body 120 provided under the membrane 110. In addition, in order to use the inverse piezoelectric effect and the piezoelectric effect of the piezoelectric element 180 for each region, a plurality of patterned piezoelectric elements 180 may be formed. For example, four piezoelectric elements 180 may be patterned as shown. Two piezoelectric elements 183 provided at an inner side among them may be a sensing unit sensing the displacement of the mass body 120 (using the piezoelectric effect), and two piezoelectric elements 185 provided at an outer side among them may be a driving unit driving the mass body 120 (using the inverse piezoelectric effect). However, the number of patterned piezoelectric elements 180 and positions of the sensing unit and the driving unit are not limited to the above-mentioned configuration but may be variously changed. For example, in the case of using the inertial sensor 100 only as an acceleration sensor, since the mass body 120 needs not to be driven in order to measure angular velocity, the driving unit may also be omitted.

The inertial sensor 100 may measure the general acceleration and angular velocity by using the inverse piezoelectric effect and the piezoelectric effect of the piezoelectric element 180 described above. However, due to characteristics of the piezoelectric element 180 (such as characteristics that generated charges disappear in the piezoelectric element or the piezoelectric element is sensitive to a temperature), it is difficult to measure static DC acceleration such as gravity acceleration, or the like, only using the piezoelectric element 180.

However, the inertial sensor 100 according to the present embodiment includes the plurality of patterned magnets 140 and the magnetoresistive element 150, thereby making it possible to measure the static DC acceleration. Here, the plurality of patterned magnets 140 are provided under the mass body 120. For example, the magnets 140 may be formed by locally magnetizing a ferromagnetic material 130 provided on a lower surface of the mass body 120 (See FIG. 1A) or be separately provided on the lower surface of the mass body 120 (See FIG. 1B). In the case in which the magnets 140 are formed by locally magnetizing the ferromagnetic material 130 (See FIG. 1A), the magnets 140 are buried in the ferromagnetic material 130. On the other hand, in the case in which the magnets 140 are separately provided on the lower surface of the mass body 120 (See FIG. 1B), the magnets 140 are formed to be protruded from the lower surface of the mass body 120. In addition, the magnetoresistive element 150 may be provided on the cap 170, or the like, so as to be spaced apart from the mass body 120 and be connected to a controlling unit through a wiring 220. Therefore, the magnetoresistive element 150 may measure the static DC acceleration acting on the mass body 120 through the resistance changed according to magnetic fields of the plurality of patterned magnets 140.

More specifically, as shown in FIG. 2, the plurality of patterned magnets 140 may include a first magnet 143 provided on the center axis of the mass body 120 and a plurality of second magnets 145 provided on a single circle based on the first magnet 143. Here, the plurality of second magnets 145 may be provided in a first direction (an X-axis direction) and a second direction (a Y-axis direction) perpendicular to the first direction and be provided to be symmetrical to each other based on the first magnet 143. That is, in the plurality of patterned magnets 140, each of four second magnets 145 may be disposed in a cross shape in a +X axis direction, a −X axis direction, a +Y axis direction, and a −Y axis direction based on the first magnet 143. As described above, the first and second magnets 143 and 145 configure the magnet 140 and the magnetoresistive element 150 is provided under the plurality of patterned magnets 140, thereby making it possible to measure the static DC acceleration acting on the mass body 120.

FIGS. 3 and 4 are cross-sectional views showing a process of measuring static DC acceleration in the inertial sensor shown in FIG. 1A. The process of measuring static DC acceleration will be described with reference to FIGS. 3 and 4.

Before the static DC acceleration acts, the magnetoresistive element 150 is affected by a magnetic field of the first magnet 143 since it is disposed under the first magnet 143 (See FIG. 1A).

Figure 3A:
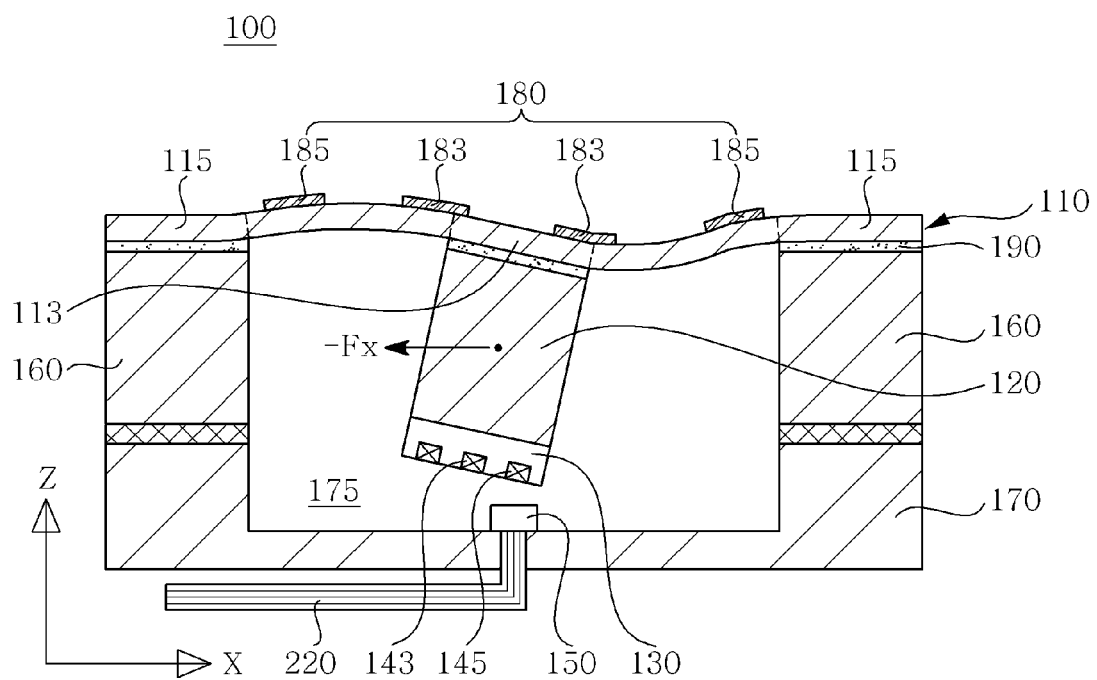
FIGS. 3 and 4 are cross-sectional views showing a process of measuring static DC acceleration in the inertial sensor shown in FIG. 1A.

Then, as shown in FIG. 3A, when the static DC acceleration acts on the mass body 120 in the +X axis direction, the mass body 120 moves in the −X axis direction by inertial force −Fx. When the mass body 120 moves in the −X axis direction, the magnetoresistive element 150 is affected by a magnetic field of the second magnet 145 disposed in the +X axis direction from the first magnet 143. That is, the magnetoresistive element 150 is affected by the magnetic field of the first magnet 143 and is then affected by the magnetic field of the second magnet 145 disposed in the +X axis direction from the first magnet 143. Therefore, the resistance of the magnetoresistive element 150 is changed, and the static DC acceleration in the +X axis direction acting on the mass body 120 may be measured through the change in resistance.

Figure 3B:
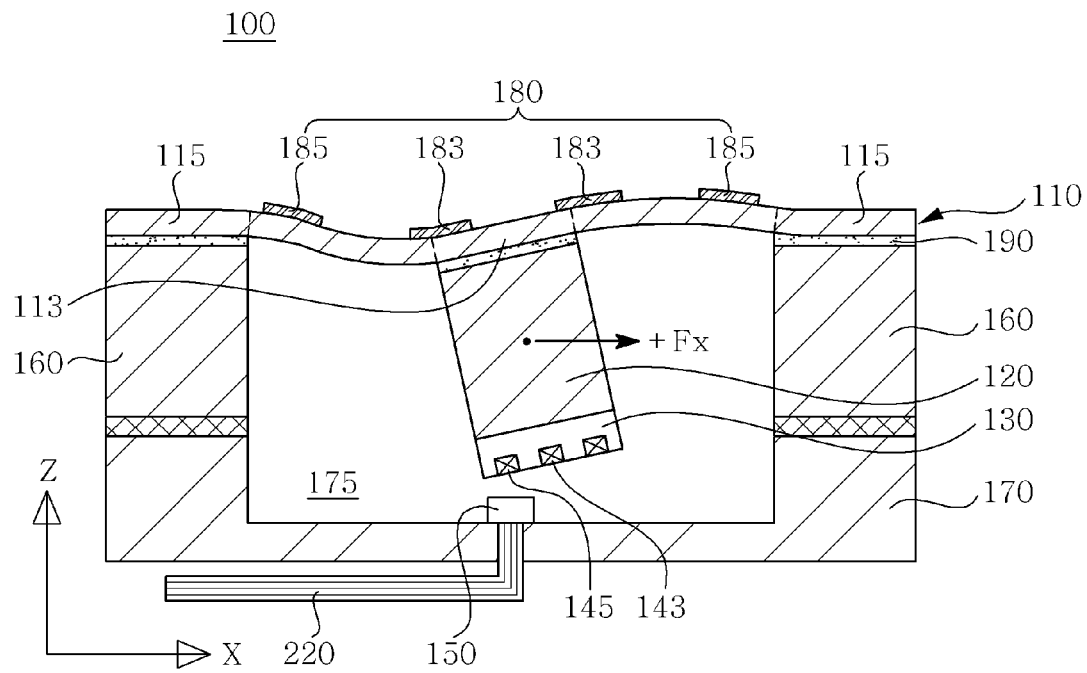

On the other hand, thereafter, as shown in FIG. 3B, when the static DC acceleration acts on the mass body 120 in the −X axis direction, the mass body 120 moves in the +X axis direction by inertial force +Fx. When the mass body 120 moves in the +X axis direction, the magnetoresistive element 150 is affected by a magnetic field of the second magnet 145 disposed in the −X axis direction from the first magnet 143. That is, the magnetoresistive element 150 is affected by the magnetic field of the first magnet 143 and is then affected by the magnetic field of the second magnet 145 disposed in the −X axis direction from the first magnet 143. Therefore, the resistance of the magnetoresistive element 150 is changed, and the static DC acceleration in the −X axis direction acting on the mass body 120 may be measured through the change in resistance.

In addition, similar to the above-mentioned principle, the second magnets 145 disposed in the +Y axis direction and −Y axis direction from the first magnet 143 is used, thereby making it possible to measure the static DC acceleration in the +Y axis direction or the −Y axis direction. Further, each of the plurality of patterned magnets 140 may have different magnetic forces so that as the magnets 140 having the magnetic fields affecting the magnetoresistive element 150 are changed, the change in resistance of the magnetoresistive element 150 becomes clear.

Figure 4A:
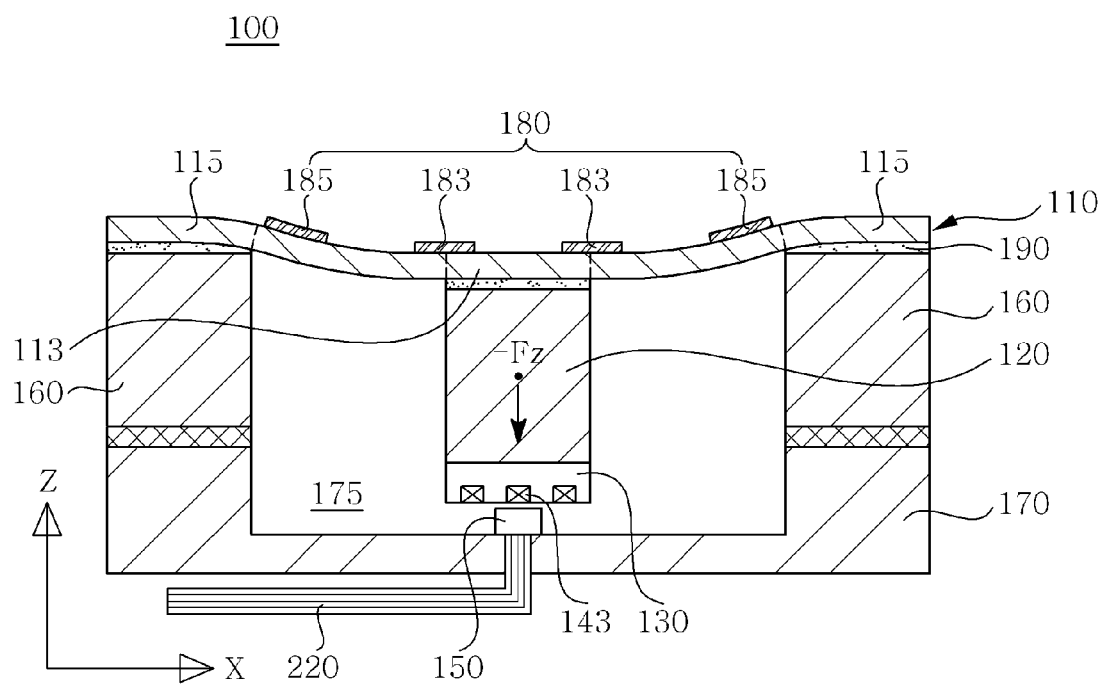

Meanwhile, as shown in FIG. 4A, when the static DC acceleration acts on the mass body 120 in a +Z axis direction, the mass body 120 moves in a −Z axis direction by inertial force −Fz. When the mass body 120 moves in the −Z direction, since the first magnet 143 and the magnetoresistive element 150 become close to each other, the magnetic field of the first magnet 143 affecting the magnetoresistive element 150 increases, such that the resistance of the magnetoresistive element 150 is changed. As described above, the static DC acceleration in the +Z axis direction acting on the mass body 120 may be measured through the change in resistance of the magnetoresistive element 150.

Figure 4B:
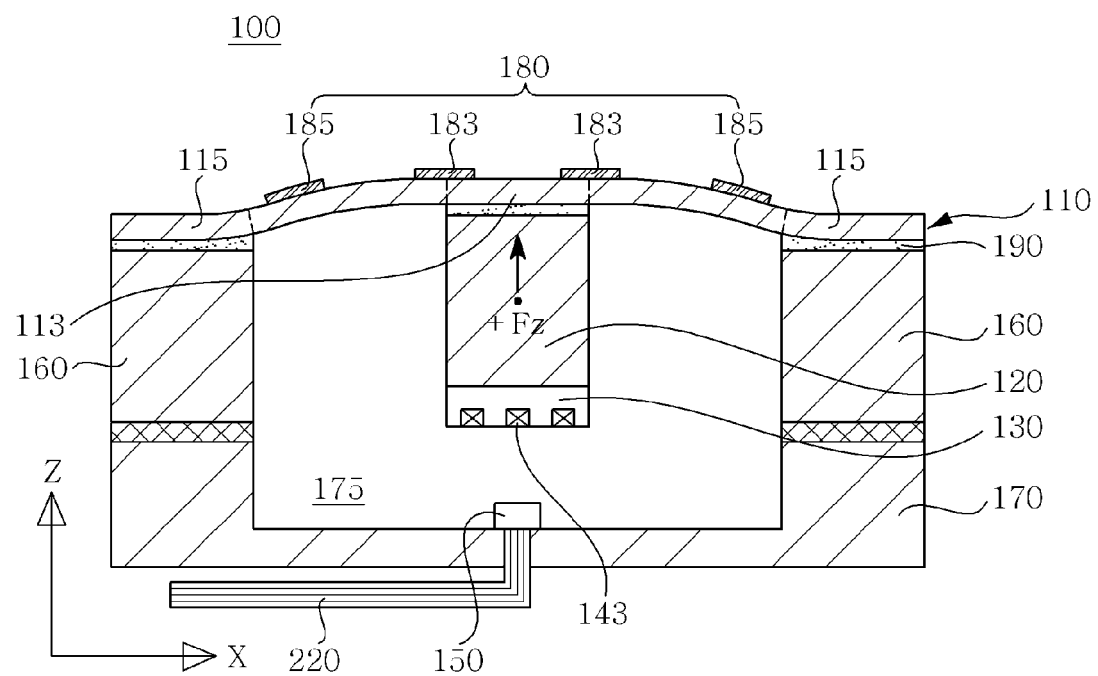

On the other hand, as shown in FIG. 4B, when the static DC acceleration acts on the mass body 120 in the −Z axis direction, the mass body 120 moves in the +Z axis direction by inertial force +Fz. When the mass body 120 moves in the +Z direction, since the first magnet 143 and the magnetoresistive element 150 become distant from each other, the magnetic field of the first magnet 143 affecting the magnetoresistive element 150 decreases, such that the resistance of the magnetoresistive element 150 is changed. As described above, the static DC acceleration in the −Z axis direction acting on the mass body 120 may be measured through the change in resistance of the magnetoresistive element 150.

However, a principle of measuring the static DC acceleration described above is only an example. That is, any principle capable of measuring the static DC acceleration through the resistance of the magnetoresistive element 150 changed according to a magnetic field of the magnet 140 is included in the scope of the present invention.

In addition, the plurality of patterned magnets 140 are not also limited to the above-mentioned content, but may be variously changed.

Figure 5:
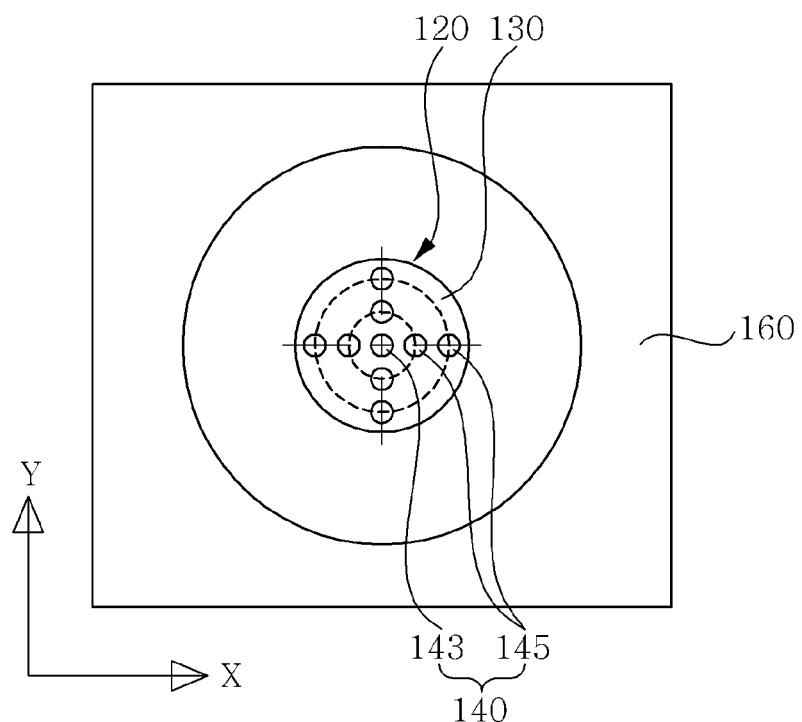
FIG. 5 is a bottom view showing a modified example of the inertial sensor shown in FIG. 2.

FIG. 5 is a bottom view showing a modified example of the inertial sensor shown in FIG. 2. As shown in FIG. 5, a plurality of patterned magnets 140 may include a first magnet 143 provided on the center axis of the mass body 120 and a plurality of second magnets 145 provided on concentric circles based on the first magnet 143. Here, the plurality of second magnets 145 may be provided in a first direction (an X-axis direction) and a second direction (a Y-axis direction) perpendicular to the first direction and be provided to be symmetrical to each other based on the first magnet 143. That is, in the plurality of patterned magnets 140, <the number of concentric circles×4> second magnets 145 may be disposed in a cross shape based on the first magnet 143. As described above, the number of second magnets 145 is increased, such the inertial sensor 100 may more precisely measure the static DC acceleration.

Figure 6:
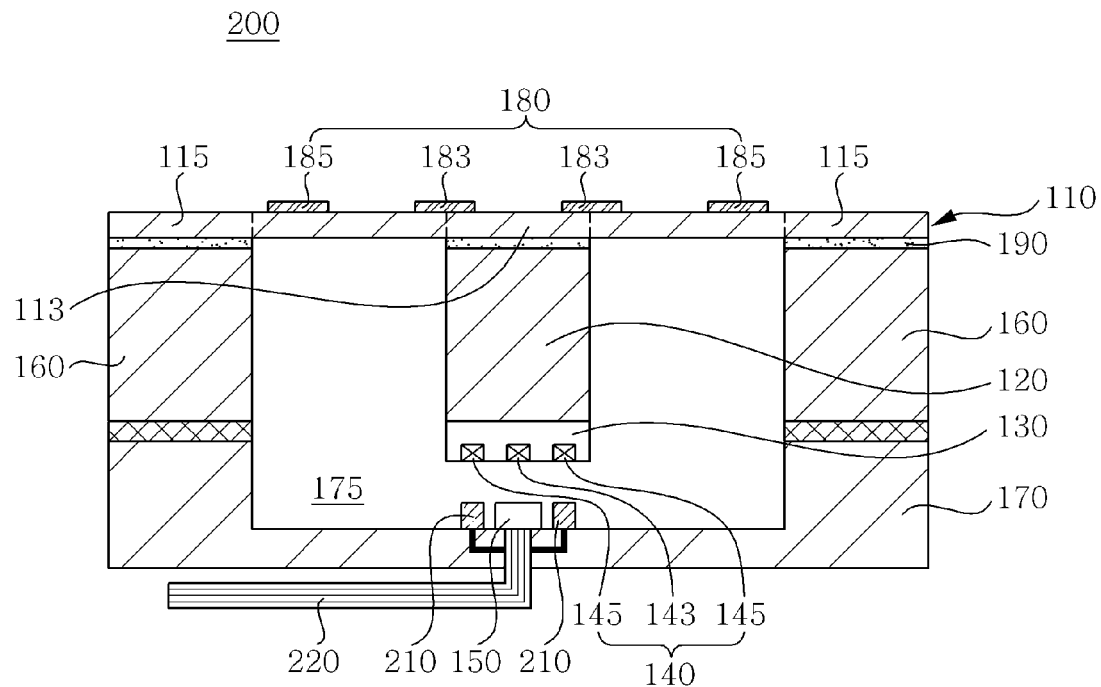
FIG. 6 is a cross-sectional view of an inertial sensor according to another preferred embodiment of the present invention.
Figure 7A:
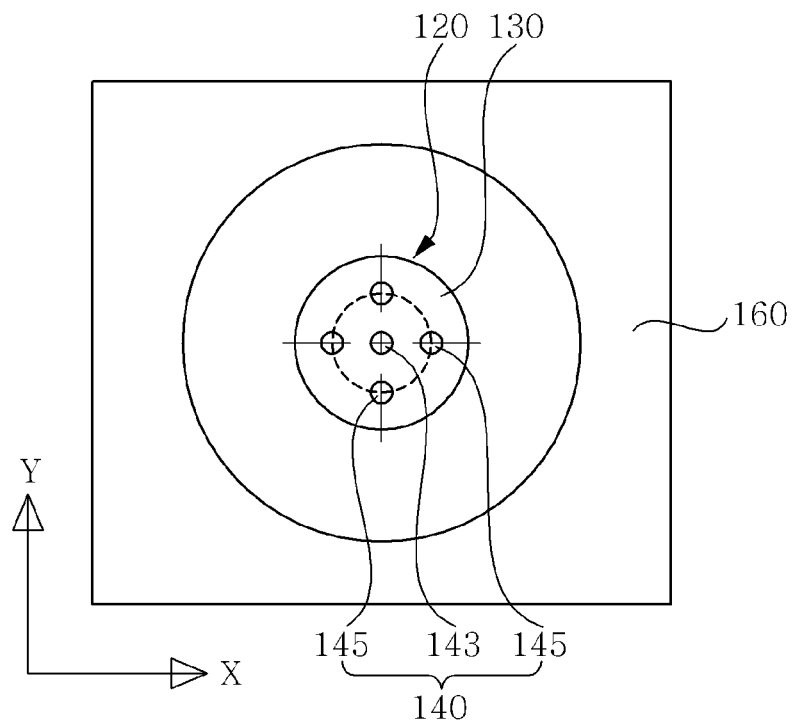
FIGS. 7A and 7B are bottom views showing a process of adding a magnet by locally magnetizing a ferromagnetic material shown in FIG. 6.
Figure 7B:
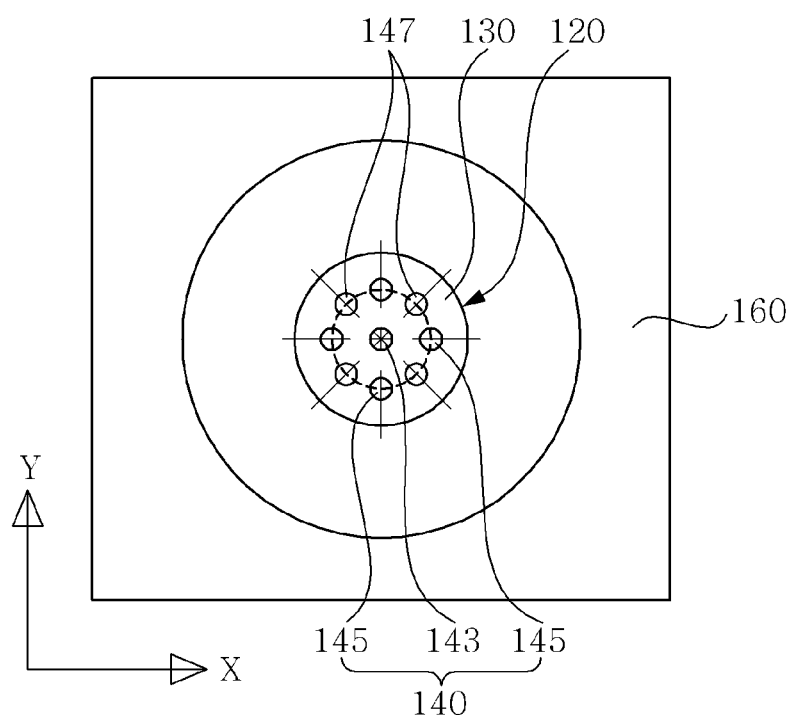

Meanwhile, FIG. 6 is a cross-sectional view of an inertial sensor according to another preferred embodiment of the present invention; and FIGS. 7A and 7B are bottom views showing a process of adding a magnet by locally magnetizing a ferromagnetic material shown in FIG. 6.

As shown in FIG. 6, the inertial sensor 200 according to the present embodiment includes an electromagnet 210 provided in a cap 170, or the like, so as to be spaced apart from a mass body 120, wherein the electromagnet 210 may be connected to a controlling unit through a wiring 220. Here, the electromagnet 210 may additionally form magnets 140 by locally magnetizing a ferromagnetic material 130 provided on a lower surface of the mass body 120.

More specifically, as shown in FIG. 7A, at the time of initial design, a plurality of patterned magnets 140 may be configured of a first magnet 143 provided on the center axis of the mass body 120 and second magnets 145 provided in a first direction (an X axis direction) and a second direction (a Y axis direction) perpendicular to the first direction based on the first magnet 143. Then, as shown in FIG. 7B, when the ferromagnetic material 130 is locally magnetized using the electromagnet 210, the plurality of patterned magnets 140 may include third magnets 147 additionally formed in a third direction (a +45° direction from the X axis) and a fourth direction (a −45° direction form the X axis) based on the first magnet 143. As described above, the third magnets 147 provided in the third direction (the +45° direction from the X axis) and the fourth direction (the −45° direction form the X axis) based on the first magnet 143 are added, such that the inertial sensor 200 may more precisely measure the static DC acceleration in the third direction (the +45° direction from the X axis) and the fourth direction (the −45° direction form the X axis).

However, a case in which the third magnets 147 are added in the third direction (the +45° direction from the X axis) and the fourth direction (the −45° direction form the X axis) based on the first magnet 143 by locally magnetizing the ferromagnetic material 130 using the electromagnet 210 is only an example. That is, the electromagnet 210 magnetizes the entire portion of the ferromagnetic material 130 as needed, thereby making it possible to add the third magnets 147.

As set forth above, according to the preferred embodiments of the present invention, the plurality of patterned magnets and the magnetoresistive element are included, thereby making it possible to measure the static DC acceleration (particularly, the gravity acceleration) that is difficult to measure using an existing piezoelectric element.

In addition, according to the preferred embodiments of the present invention, the ferromagnetic material is locally magnetized using the electromagnet to additionally form the magnet, thereby making it possible to more precisely measure the static DC acceleration (particularly, the gravity acceleration).

Although the embodiment of the present invention has been disclosed for illustrative purposes, it will be appreciated that an inertial sensor according to the invention is not limited thereto, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. A sensor capable of measuring acceleration, angular velocity and DC acceleration, the sensor comprising:
   a mass body;
   a membrane connected to the mass body, the membrane comprising at least one of a sensor unit configured to sense the displacement of the mass body, and a driver unit configured to drive the mass body;
   a plurality of patterned magnets provided under the mass body; and
   a magnetoresistive element provided to be spaced apart from the mass body,
   wherein the sensor unit is further configured to sense the acceleration or angular velocity, and
   wherein the magnetoresistive element is configured to measure static DC acceleration acting on the mass body through resistance changed according to magnetic fields of the plurality of patterned magnets.

2. The sensor capable of measuring acceleration, angular speed and DC acceleration as set forth in claim 1, further comprising a ferromagnetic material provided on a lower surface of the mass body,
   wherein a magnet is formed by locally magnetizing the ferromagnetic material.

3. The sensor capable of measuring acceleration, angular speed and DC acceleration as set forth in claim 1, further comprising:
   a ferromagnetic material provided on a lower surface of the mass body; and
   an electromagnet provided to be spaced apart from the mass body and additionally forming a magnet by locally magnetizing the ferromagnetic material.

4. The sensor capable of measuring acceleration, angular speed and DC acceleration as set forth in claim 1, further comprising a post provided under an edge of the membrane,
   wherein the mass body is provided under a central portion of the membrane.

5. The sensor capable of measuring acceleration, angular speed and DC acceleration as set forth in claim 4, further comprising a cap having an edge coupled to a lower surface of the post so as to cover the mass body and the post and spaced apart from the mass body.

6. The sensor capable of measuring acceleration, angular speed and DC acceleration as set forth in claim 5, wherein the magnetoresistive element is provided on the cap.

7. The sensor capable of measuring acceleration, angular speed and DC acceleration as set forth in claim 5, wherein an upper surface of the cap is provided with a concave part depressed in a thickness direction.

8. The sensor capable of measuring acceleration, angular speed and DC acceleration as set forth in claim 1, wherein each of the plurality of patterned magnets has different magnetic forces.

9. The sensor capable of measuring acceleration, angular speed and DC acceleration as set forth in claim 1, wherein the plurality of patterned magnets include:
   a first magnet provided on a center axis of the mass body; and
   a plurality of second magnets provided on a single circle or concentric circles based on the first magnet.

10. The sensor capable of measuring acceleration, angular speed and DC acceleration as set forth in claim 9, wherein the plurality of second magnets are provided in a first direction and a second direction perpendicular to the first direction based on the first magnet.

11. The sensor capable of measuring acceleration, angular speed and DC acceleration as set forth in claim 9, wherein the plurality of second magnets are provided to be symmetrical to each other based on the first magnet.

12. The sensor capable of measuring acceleration, angular speed and DC acceleration as set forth in claim 1, wherein the sensor unit and the driver unit are made of a piezoelectric element.

13. The sensor capable of measuring acceleration, angular speed and DC acceleration as set forth in claim 12, wherein the piezoelectric element is formed of lead zirconate titanate (PZT), barium titanate ($BaTiO_3$), lead titanate ($PbTiO_3$), lithium niobate ($LiNbO_3$), or quartz ($SiO_2$).

14. The sensor capable of measuring acceleration, angular speed and DC acceleration as set forth in claim 1, wherein the plurality of patterned magnets is formed to be protruded from a lower surface of the mass body.

* * * * *